(12) United States Patent
Burns

(10) Patent No.: US 7,304,839 B1
(45) Date of Patent: Dec. 4, 2007

(54) OUTDOOR LAPTOP COMPUTER PROTECTOR

(76) Inventor: James Burns, 4221 NE. 25th Ave., Lighthouse Point, FL (US) 33064

( * ) Notice: Subject to any disclaimer, the term of this patent is extended or adjusted under 35 U.S.C. 154(b) by 0 days.

(21) Appl. No.: 11/307,181

(22) Filed: Jan. 26, 2006

(51) Int. Cl.
*H05K 7/00* (2006.01)

(52) U.S. Cl. .......................... 361/683; 361/681; 108/38
(58) Field of Classification Search ................ 359/610, 359/611, 612; 361/683, 681; 108/38
See application file for complete search history.

(56) References Cited

U.S. PATENT DOCUMENTS

| | | | |
|---|---|---|---|
| 5,218,474 A | 6/1993 | Kirschner | |
| 5,355,555 A * | 10/1994 | Zarelius | ........................ 16/225 |
| 5,717,566 A | 2/1998 | Tao | |
| 5,877,896 A * | 3/1999 | Gremban | ..................... 359/601 |
| 5,905,546 A | 5/1999 | Giulie et al. | |
| 5,988,823 A | 11/1999 | Wong | |
| 6,084,711 A * | 7/2000 | Duff | ........................... 359/601 |
| 6,115,238 A * | 9/2000 | von Gutfeld | ................ 361/681 |
| 6,144,419 A | 11/2000 | Schmidt | |
| 2005/0150432 A1* | 7/2005 | Wen | ............................ 108/38 |

* cited by examiner

*Primary Examiner*—Jayprakash Gandhi
*Assistant Examiner*—Ingrid Wright
(74) *Attorney, Agent, or Firm*—Malin, Haley & DiMaggio, P.A.

(57) ABSTRACT

A laptop computer outdoor protector attached to a laptop computer support surface for protecting a laptop computer during outdoor operation with the monitor disposed vertically to reduce glare from sunlight or other high intensity ambient light and to protect the laptop computer from wind, rain, snow or other objects such as tennis balls or golf balls. The protector may also be folded and stored while connected to the top of the laptop support surface when not in use.

8 Claims, 4 Drawing Sheets

OUTDOOR LAPTOP COMPUTER PROTECTOR

DESCRIPTION

1. Field of the Invention

The invention relates to an outdoor laptop computer protector attached to a portable laptop computer support surface to provide a sunshade, weather protector and projectile protector when using a laptop computer outdoors.

2. Description of Related Art

The liquid crystal display (LCD) monitors of laptop computers, while being lightweight and having excellent picture clarity, often appear washed out or faded when exposed to sunlight or high intensity ambient light. The reduction in visibility of the LCD display reduces the user's ability to use the laptop computer outdoors as well as in rooms having direct sunlight or high intensity lighting. Currently, the prior art provides hoods and shades to inhibit exposure of desktop computer monitors to sunlight and other sources of bright light that may reduce visibility. Several bulky laptop computer hoods also exist in the prior art, however, there are no lightweight, portable sunshades specifically for use with laptop computers and which are easily collapsible to a small portable size.

Additionally, stemming from the recent trend of the mobile businessman and frequent traveler, the use of portable laptop computer stands has increased. These stands typically have telescopic stems with flat laptop rigid support surfaces resting on top of the stem. The user may then place his/her laptop computer on top of the flat support surface of the stand and operate the computer as if he/she were sitting at a desk. These portable laptop support stands are useful outdoors. However, the problem of glare still remains when using a laptop stand, as well as the problem of storage of the two computer accessories. Additionally, there is a problem with stabilization of a glare reducing device on a stand having no vertical sidewalls and a limited surface area.

U.S. Pat. No. 5,988,823, issued to Wong on Nov. 23, 1999, describes a collapsible laptop computer hood that relies on weight of the laptop computer to retain its shape and location. The user visibility is limited due to the front panel aperture.

U.S. Pat. No. 5,218,474, issued to Kirschner on Jun. 8, 1993, describes a visor for a video display terminal comprised of a U-shaped structure having hinged vinyl panels. A drawback in using the '474 invention with a laptop computer is the requirement that said visor be attached directly to the display monitor bezel of said laptop computer using hook-and-loop fasteners that must be glued or otherwise attached to the sides of the display monitor.

U.S. Pat. No. 5,717,566, issued to Tao on Feb. 10, 1998, describes a shading device for a display screen of a laptop computer. The upper right and left panels are each connected by a separate hinge to a top panel bracket that engages the top portion of the laptop's display screen.

U.S. Pat. No. 5,905,546, issued to Giulie et al., on May 18, 1999, describes a visor for a laptop computer screen that is detachable and collapsible, and thus, portable. The '546 invention includes a top panel and two side panels for directly engaging the sides of the laptop computer display monitor. The installation and use is cumbersome.

U.S. Pat. No. 6,144,419, issued to Schmidt on Nov. 7, 2000, describes a collapsible glare reduction device for a video monitor, which includes hook-and-loop fastener strips for attaching the device to the monitor. The installation and use is cumbersome.

Laptop computers are frequently used outdoors. Portable laptop support tables are known for indoor and outdoor use for supporting laptop computers anywhere. Outdoor use of a laptop computer exposes the laptop computer to excessive sun glare, wind and bad weather and errant projectiles such as tennis and golf balls.

SUMMARY OF THE INVENTION

An outdoor laptop computer protector attached to a laptop computer portable support surface for reducing the exposure of a laptop computer's liquid crystal display (LCD) monitor to sunlight, other sources of ambient outdoor bright light which reduce visibility of the images on said monitor for the user, and protection from outdoor elements such as wind, rain and objects such as tennis balls and golf balls. The protector is attached by a hinge to a laptop computer portable support surface and has two stable positions, a raised position for encompassing a laptop computer and a folded somewhat flat position on the laptop computer support surface. The laptop computer portable support surface and the protector operate as a single device. A portable laptop computer table or stand with adjustable or fixed legs having a laptop computer support surface is used with the protector.

The protector comprises four flat, sturdy, opaque panels pivotally attached to each other. The back panel is attached along one edge by a hinge to a laptop computer support surface. The light shade back panel has a substantially rectangular shape. The bottom edge of the back panel is attached to a hinge plate or mount. The opposing hinge plate or mount is connected to the rear area of the laptop computer support upper surface. A top panel also has a substantially rectangular shape and is pivotally attached to the top edge of the back panel through the use of attachments such as a hinge that allow the top panel to lie relatively flush against the back panel or fold outwardly away from the back panel. The left and right side panels are pivotally attached to respective side edges of the top panel through the use of attachments such as a hinge that allow the side panels to lie flush against the top panel or fold outwardly away from the top panel.

The back panel has sufficient height to extend from the laptop computer support surface to a location above the top edge of an open laptop computer monitor. The back panel has a width greater than a laptop computer and less than or substantially equal to the width of the portable laptop support surface. The top panel width is a substantially equal to the back panel width and has a height sufficient to cover a laptop computer sitting on the support surface. Each side panel has a width substantially equal to the height of the top panel. The height of the back edge of the side panels is substantially equal to the height of the back panel. Thus, the bottom edges of the side panels can be rectangular or angled downwardly from the back edge to the front edge to enlarge the height of the front user opening.

The protector is used in the raised position to enclose a laptop computer. In this position, the front side of the enclosure structure is open and the user's laptop computer can be used outdoors with the monitor raised vertically for viewing by the user.

The protector has a collapsed storage mode in which the user's laptop computer is removed from the enclosure. The back panel is first folded downwardly so that the back panel rests on top of and is flush against the portable laptop computer support surface. The top panel is folded such that the top panel rests on top of and somewhat horizontally against the back panel. One side panel is folded such that the side panel rests on top of and against the top panel. The other side panel is folded such that the other side panel rests on top of and against the opposite side panel. Thus, the protector can be folded somewhat horizontally in a stacked array on top of the portable stand support surface when not in use.

As used herein, a laptop computer includes a portable computer including a notebook computer.

Each opaque panel could be constructed of plastic, metal, heavy duty cardboard with a weather protective coating, fabric mounted in a rigid frame or other suitable material.

It is an object of this invention to provide a shield or cover attached to a laptop computer support surface for outdoor use that prevents sunlight or other bright light from creating glare and fading the images displayed on a liquid crystal display (LCD) screen of a laptop computer monitor.

Another object of this invention is to provide an outdoor protector that is attached to a portable laptop computer support surface and requires no fasteners or securing devices affixed to the laptop computer.

It is a further object of this invention to provide a laptop computer protector that can be set up or stored easily and quickly.

It is yet another object of this invention to provide a sunshade for a laptop computer support surface that can withstand wind, rain, snow or harmful objects such as golf or tennis balls from striking the laptop computer outdoors.

In accordance with these and other objects which will become apparent hereinafter, the instant invention will now be described with particular reference to the accompanying drawings.

DETAILED DESCRIPTION

Figure 1:
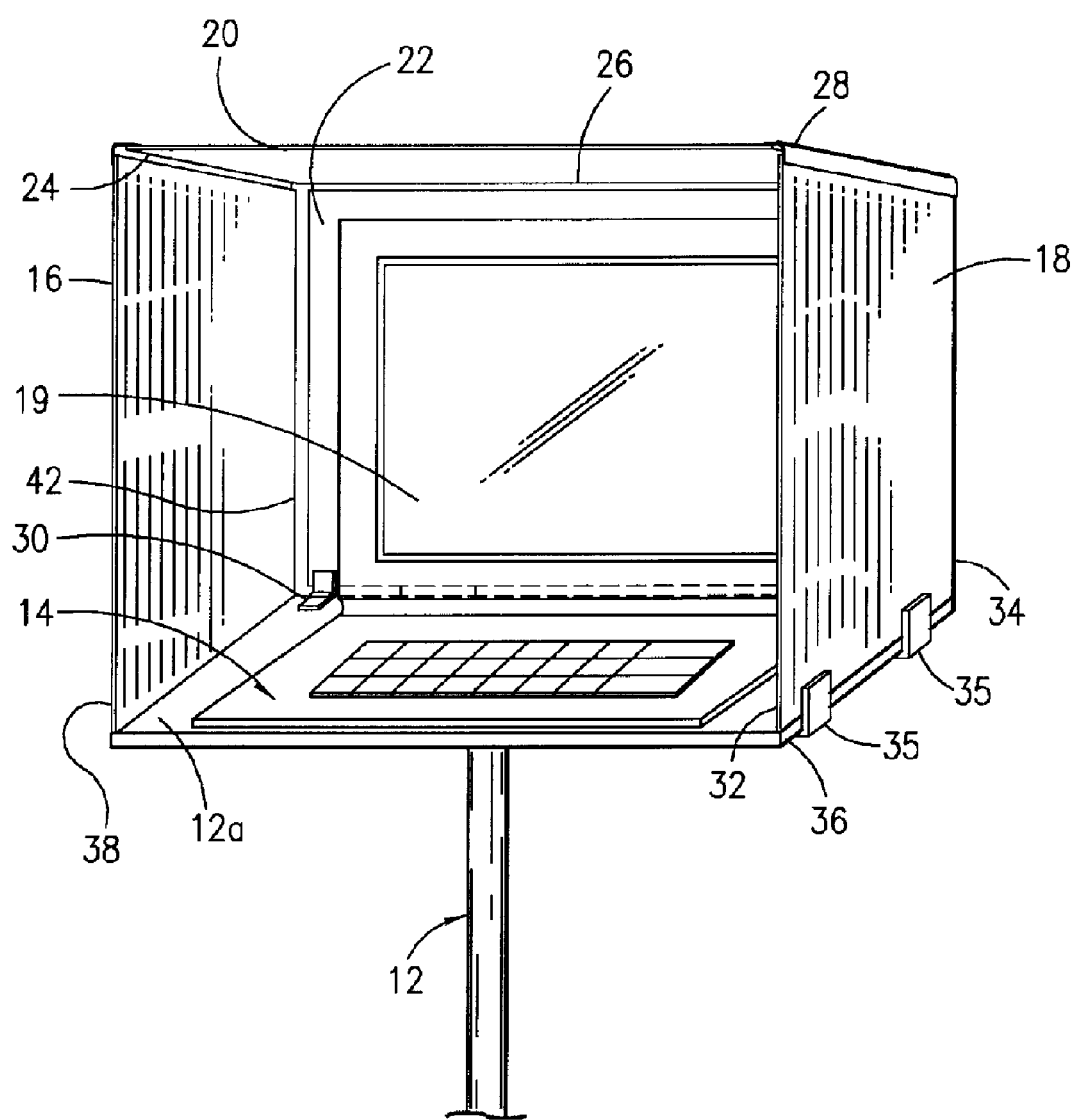
FIG. 1 is perspective view of the laptop computer protector in-use in conjunction with a portable laptop support and a laptop computer positioned therein.

FIG. 1 shows a first embodiment. Outdoor laptop computer protector 10 is shown in-use in conjunction with a portable laptop computer stand 12 having a laptop computer support surface 12a and laptop computer 14. The laptop computer protector 10 is comprised of four opaque, rigid, flat, thin panels hinged together by bookbinder tape or other synthetic fabric like tape strips to provide two modes of operation, i.e. raised for protecting an enclosed laptop computer from sunlight, sun glare, wind, rain and stray projectiles such as golf and tennis balls and collapsed (without the laptop computer) for storage. The protector 10 has a back panel 22 that is pivotally secured by hinges 30 along one edge to a laptop computer support surface 12a that is part of the portable computer stand 12. A laptop computer 14 sits on support surface 12a. Hook and loop releasable fasteners 35 attach second side panel 18 to laptop computer support surface 12a. The hook and loop fasteners 35 may be secured by glue or other fasteners to both the computer stand 12 and panel 18. Panel 16 is secured by similar releasable fasteners to the table 12.

The protector 10 has an opaque rectangular flat rigid top panel 20 pivotally secured to the back panel 22 through the use of a bookbinder tape hinge 26. The protector 10 has a first opaque side panel 16 which is secured to the top panel 20 through the use of a bookbinder tape hinge 24. In this embodiment, the side panel edge 42 has a substantially equal length to the height of the back panel 22. The hinge 24 allows the first side panel 16 to be manually moved to a vertical position and/or a horizontal position. The protector 10 has a second side panel 18 which is secured to the top panel 20 through the use of a bookbinder tape hinge 28. The back panel edge 34 has a substantially equal length to the height of the back panel 22. The hinge 28 allows the second side panel 18 to be moved to a vertical position or a horizontal position.

Figure 2:
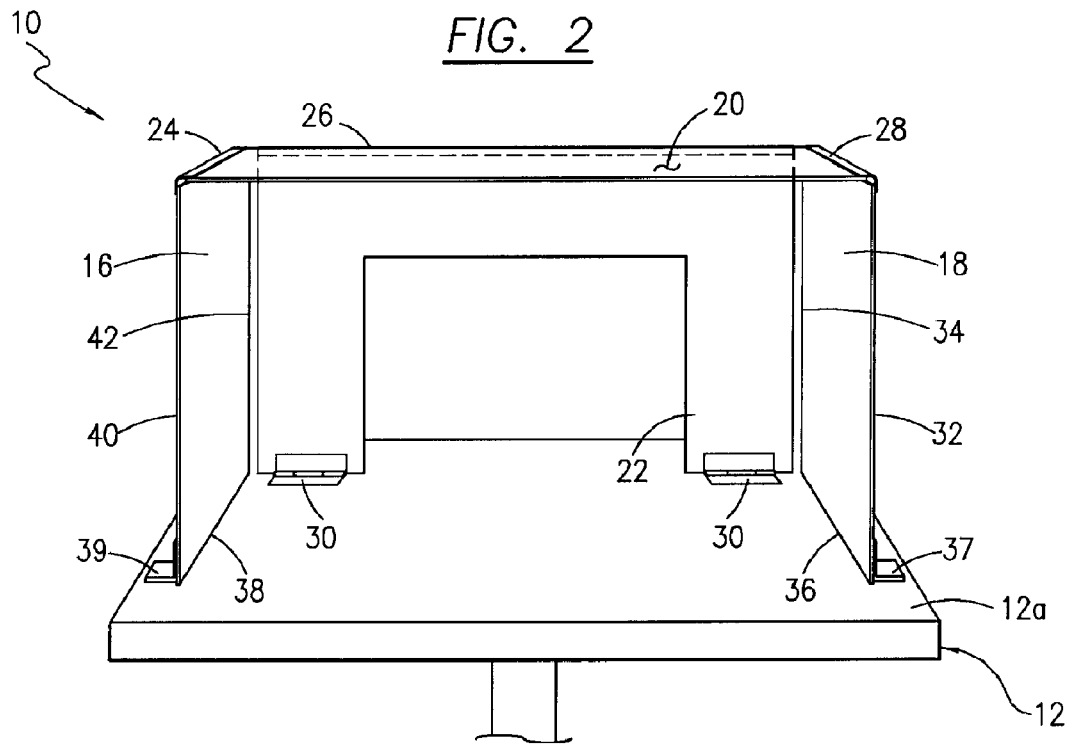
FIG. 2 is a front perspective view of the laptop computer protector in the open and upright position without a laptop computer.

In FIG. 2, the protector 10 is shown in the open and upright position as it would be in-use (without a laptop computer 14 for clarity). The back panel 22 is shown with a cutout section or area for air flow there through to reduce wind pressure on the protector. A pair of hinges 30 is shown at the bottom edge of the back panel 22. Hinges 30 are used to firmly attach pivotally the back panel 22 to a laptop support surface 12a so that the entire protector 10 is anchored securely to the support surface 12a. FIG. 2 shows the shade device 10 in its upright and open state with the back surface 22 vertical and upright, the top panel 20 extending horizontally forward from the top edge of the top panel 20, the first side surface 16 extending vertically downwardly from the top panel 20 while resting on support surface 12a, and the second side surface 18 extending hanging vertically downwardly from the top panel 20 while resting on support surface 12a. Hinge 26 is connected between the back panel 22 and the top panel 20. Hinge 24 is connected between the top panel 20 and the first side panel 16, and hinge 28 is connected between the top panel 20 and the second side panel 18. In this embodiment, the lengths of the front edges 40 and 32 of either side panels 16, 18 may be equal to the back edges 34, 42.

Figure 3:
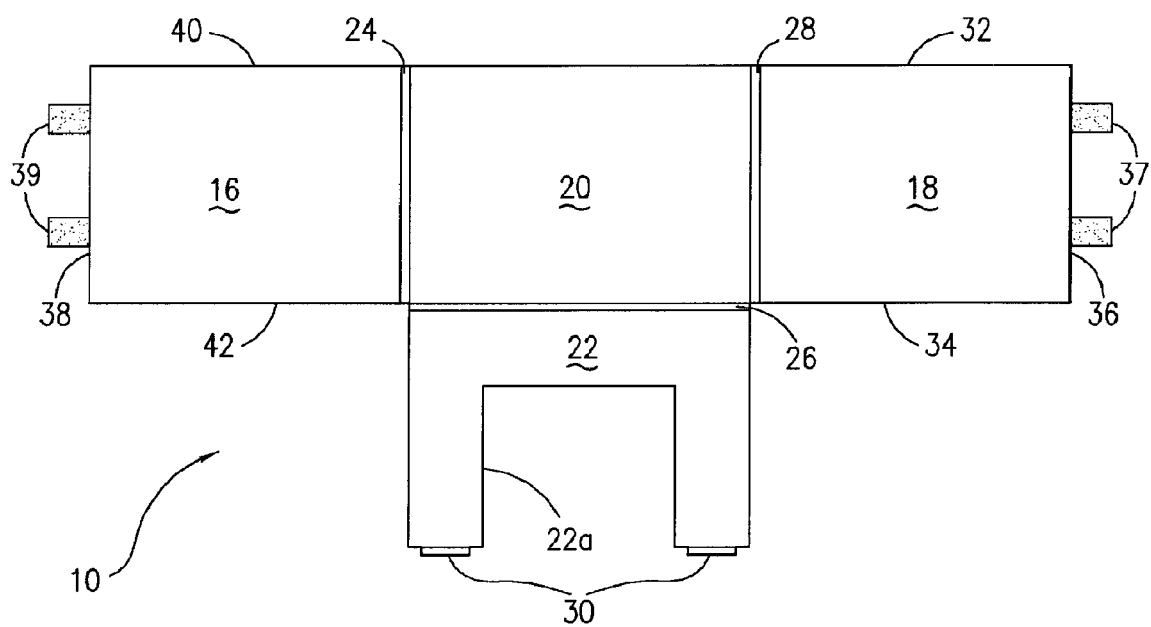
FIG. 3 is a top plan view of the laptop computer protector with all panels folded outwardly and laid flat.

Referring to FIG. 3, in this embodiment the laptop protector 10 is shown with all four panels folded outwardly and laid flat detached from the laptop support surface 12a for illustration purposes only. The top panel 20 is shown as a rectangular shape. The first side panel 16 is shown as secured to the top panel 20 through the use of a bookbinder tape hinge 24. The front edge 40, the back edge 42, and the bottom edge 38 are shown on the first side panel 16. The second side panel 18 is shown secured to the top panel 20 by bookbinder tape hinge 28. The front edge 32, the back edge 34, and the bottom edge 36 of the second side panel are shown. The back panel 22 is shown secured to the top panel 20 through the use of bookbinder hinge tape 26. The back panel 22 has a section 22a cut out to permit air flow through the device. The hinges 30 secure the back panel 22 to the laptop computer support surface 12a shown in FIGS. 1 and 2. Hinges 30 can be attached by glue or conventional screw fasteners. Other types of hinges can be also used including hinges such as those with removable pins or sliding removable hinges, or others which permit easy removal of the apparatus when desired. Because the protector 10 is used primarily outdoors to protect a laptop computer from not only the glare of sunlight, but also the elements such as wind, rain, snow, and objects such as golf balls and tennis balls, it is essential that the back panel 22 be firmly attached to the laptop computer support surface 12a (FIGS. 1 and 2).

Figure 4:
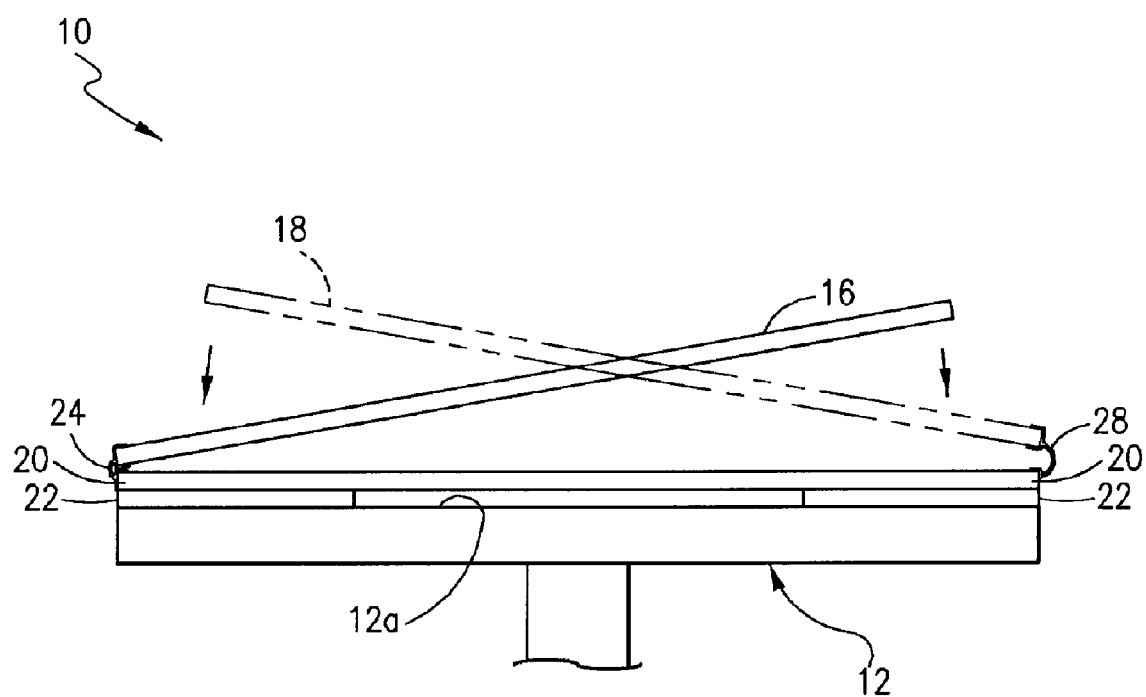
FIG. 4 is a rear elevational view of the laptop computer protector in the partially collapsed storage position showing the order of stacking the panels, panel 18 being shown in phantom.

FIG. 4 shows a rear elevational view of the protector 10 in the partially collapsed storage position with panels 20 and 22 folded and laid on top of each other and panels 16, 18 partially folded in a specific order. The back panel 22 pivots downwardly toward the flat surface of a laptop computer support surface 12a on a portable computer stand 12 by connecting hinges 30 which secure the back panel 22 to the support stand 12. The top panel 20 folds backwardly towards the back panel 22 through the use of the hinge 26 which secures the top panel 20 to the back panel 22. The first side panel 16 folds downwardly toward the top panel 20 through the use of a hinge 26. The second side panel 18 folds downwardly toward the first side panel 16 through the use of a bookbinder tape hinge 28. As depicted in the FIG. 4, in the collapsed storage state, the back panel 22 rests flat on top of the portable computer stand. The top panel 20 rests flat on top of the back panel, the first side panel 16 rests flat on top of the top panel 20, and the second side panel 18 rests flat on top of the first side panel 16.

Figure 5:
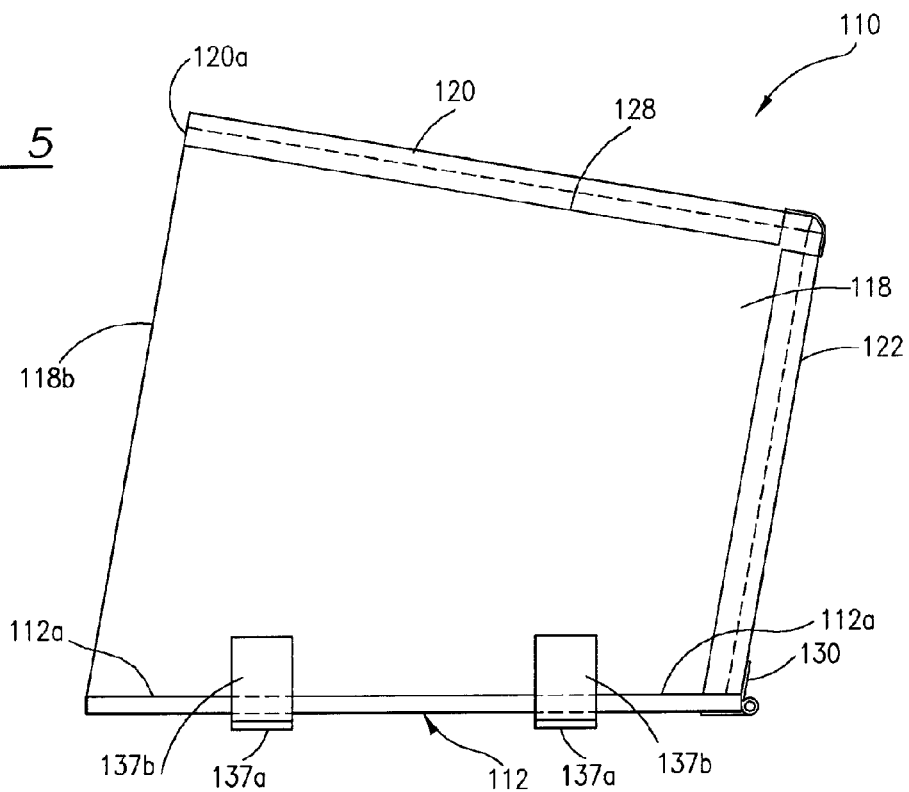
FIG. 5 is a side elevational view of the preferred embodiment of the invention.

Referring now to FIG. 5, the preferred embodiment of the invention is shown as a laptop computer protector 110 that is securely attached to a laptop computer support surface 112a by a hinge 130 that is connected to back panel 122. In the preferred embodiment, the back panel 122 is not perpendicular to the stand support surface 12a. In the preferred embodiment, the side panel 118 is enlarged along one edge to increase the viewing space available to the user. The opposite side panel (not shown) is made in a similar configuration. In this embodiment, the hook and loop fasteners 137a and 137b include at least two hook and loop fasteners 137b that are secured to the outside of panel 118 and a pair of corresponding hook and loop fasteners 137a that are secured to the bottom of laptop computer support surface 112. The opposite side of the protector 110 (not shown) includes the same hook and loop fasteners. By allowing for a higher opening, the visibility of the user is increased when the laptop computer is in place on the inside of protector 110 by having the front edge longer and higher.

Figure 6:
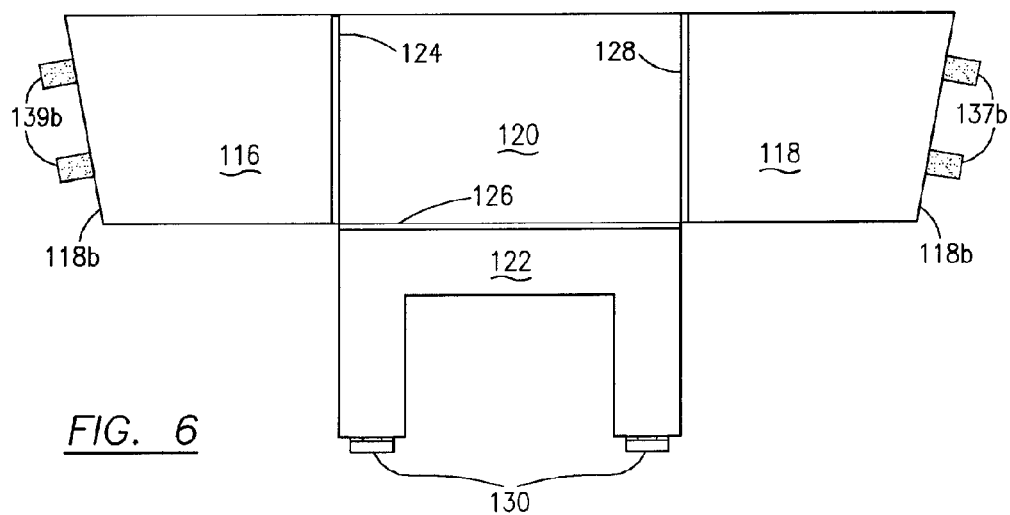
FIG. 6 is a top plan view of the preferred embodiment of FIG. 5 with the panels disposed in a same plane for illustration purposes.

Referring now to FIG. 6, the panels 116, 118, 120 and 122 are all connected together by hinges such as bookbinder tape hinges as shown in FIG. 1. However, referring back to FIG. 5, instead of the side panels 118 and 116 resting on top of laptop computer support surface 112a as in FIG. 1, in FIG. 5, the hook and loop fasteners 137a and 137b are attached such that the side panels 116 and 118 are flush with the side of the support surface 112a on each side.

The portable laptop computer protector and support surface can be used outdoors to reduce sunlight glare in an enclosure that protects the laptop computer on a portable stand that is easily set up or stored.

The instant invention has been shown and described herein in what is considered to be the most practical and preferred embodiment. It is recognized, however, that departures may be made therefrom within the scope of the invention and that obvious modifications will occur to a person skilled in the art.

What is claimed is

1. A laptop computer outdoor protector connected to a laptop support surface for reducing glare around the laptop computer monitor and protecting a laptop computer from wind, rain, snow or other objects such as golf balls and tennis balls comprising:

a first opaque thin rigid panel having a top edge, a bottom edge, and two side edges;

a first hinge;

a second opaque panel having a front edge, a back edge and two side edges, said opaque panel movably connected to said first opaque panel by said first hinge between the first panel top edge and said second panel;

a second hinge;

a third opaque panel having a top edge, a bottom edge and two side edges, said third panel connected along one side edge by said second hinge to said second panel side edge;

a third hinge;

a fourth panel having a top edge, bottom edge and two side edges connected by one side edge to said third hinge and to said second panel side edge;

a portable vertically supported laptop stand having a horizontal portable laptop support surface for supporting a laptop computer;

a fourth hinge;

said first panel bottom edge being removably attached to said laptop stand portable laptop support surface by said fourth hinge or by said first, second, third and fourth panels manipulated into an enclosure mounted on top of said laptop stand portable laptop support surface having a front opening, said enclosure including said second panel being a top of the enclosure, said third and fourth panels being sides of the enclosure and said first panel being the back of said enclosure;

a first fastener for fastening said side panel to said laptop stand portable laptop support surface along its lower edge;

a second fastener connected to the lower edge of said opposite side panel and connectable to said laptop stand portable laptop support surface, said first, second, third and fourth panels being sized so that in the raised enclosure position a laptop computer can fit inside the enclosure with the laptop computer monitor being raised vertically; and said first, second, third and fourth panels in the raised position protecting a laptop computer disposed in said enclosure from sunlight to reduce glare or ambient bright light to reduce glare or to protect the computer from wind, rain, snow or other objects such as a tennis ball or a golf ball.

2. A device as in claim 1, wherein:

said first panel, said second panel, said third panel and said fourth panel are substantially rectangular in shape such that the enclosure forms essentially a rectangular polyhedron.

3. A device as in claim 1, including:

said third panel and said fourth panel being trapezoidally shaped so that in the raised enclosure position the front edges of each of the side panels is higher than the back edges of each of the side panels to increase the amount of visibility for observing the laptop computer disposed inside the enclosure.

4. A device as in claim 1, wherein:

said first panel can be pivoted approximately flush with the laptop stand portable laptop computer support surface, said second panel being collapsible to rest on top of said first panel approximately horizontally, said third panel being movably positionable on top of said second panel and said fourth panel being movably positioned substantially horizontally on top of said third panel whereby the panels may be stacked accordingly in the storage position while firmly attached to the laptop stand portable laptop computer support surface.

5. A device as in claim 1, including:

said first, second, third and fourth hinges are made of bookbinder's tape.

6. A device as in claim 1, wherein:

said first, second, third and fourth hinges are made of a continuous mechanical hinge.

7. A device as in claim 1, wherein:

a fifth hinge connected to said laptop stand portable laptop computer support surface and said first panel;

said fifth hinge being a panel hinge and is removably mounted to said laptop stand portable laptop computer support surface and said first panel.

8. A portable laptop stand having a laptop support surface and a collapsible laptop protective enclosure to protect an enclosed laptop computer from sun glare, rain and flying projectiles removably attached thereto.

\* \* \* \* \*